United States Patent [19]

Kim

[11] Patent Number: 5,563,745

[45] Date of Patent: Oct. 8, 1996

[54] TRACKING CONTROL APPARATUS AND METHOD FOR DIGITAL/ANALOG VIDEO RECORDING/PLAYBACK, WHICH USES THE ANALOG HEADS FOR TRACKING CONTROL DURING DIGITAL RECORDING/REPRODUCTION

[75] Inventor: Soo K. Kim, Seoul, Rep. of Korea

[73] Assignee: Goldstar Co., Ltd., Seoul, Rep. of Korea

[21] Appl. No.: 186,853

[22] Filed: Jan. 27, 1994

[30] Foreign Application Priority Data

Feb. 5, 1993 [KR] Rep. of Korea ............. 1577/1993

[51] Int. Cl.[6] .................................. G11B 20/00
[52] U.S. Cl. ................. 360/18; 360/64; 360/77.13
[58] Field of Search .................... 360/18, 64, 27, 360/32, 73.12, 77.12, 77.13, 7, 10.2

[56] References Cited

U.S. PATENT DOCUMENTS

| | | | |
|---|---|---|---|
| 4,660,100 | 4/1987 | Sugiyama et al. | 360/48 |
| 4,791,512 | 12/1988 | Takahashi et al. | 360/10.2 |
| 4,942,487 | 7/1990 | Nogughi et al. | 360/77.13 |
| 5,182,681 | 1/1993 | Yamazaki | 360/73.12 X |
| 5,296,977 | 3/1994 | Fujioka | 360/27 X |
| 5,303,094 | 4/1994 | Kato et al. | 360/32 |
| 5,323,273 | 6/1994 | Azuma et al. | 360/19.1 |
| 5,369,531 | 11/1994 | Kubota et al. | 360/18 |
| 5,381,280 | 1/1995 | Lee | 360/64 |

FOREIGN PATENT DOCUMENTS

| | | |
|---|---|---|
| 60-209969 | 10/1985 | Japan. |
| 63-298865 | 12/1988 | Japan. |
| 4-32014 | 2/1992 | Japan. |

*Primary Examiner*—Aristotelis Psitos
*Assistant Examiner*—Lawrence Cullen

[57] ABSTRACT

Tracking control apparatus and method for a digital/analog recording/playback system which is capable of recording and playing back a digital video signal as well as an analog video signal compatible with an existing VHS system. A tracking signal is recorded by first and second heads for the recording and playback of an analog video signal, and a digital video signal is recorded by third and fourth heads for the recording and playback of the digital video signal. The recorded tracking signal is played back by the first and second heads and the recorded digital video signal is played back by the third and fourth heads. The digital video signal is recorded on a portion of a tape wound at an angle of 180° with respect to a head drum and the tracking signal is recorded on upper and lower 5° portions adjoining the 180°-wound portion of the tape. Therefore, a loss of the digital video signal can be avoided. This has the effect of obtaining a high picture quality.

9 Claims, 4 Drawing Sheets

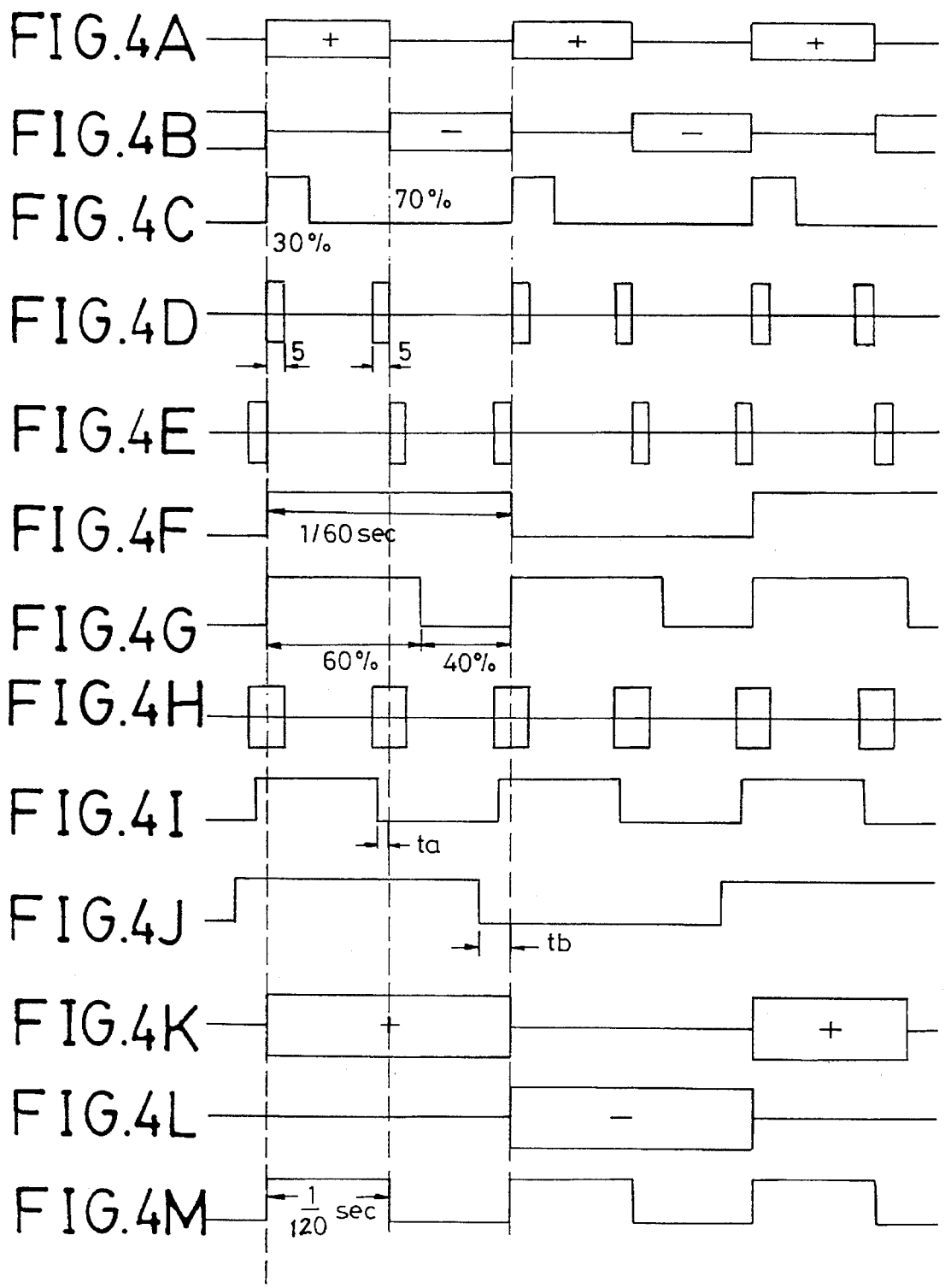

TRACKING CONTROL APPARATUS AND METHOD FOR DIGITAL/ANALOG VIDEO RECORDING/PLAYBACK, WHICH USES THE ANALOG HEADS FOR TRACKING CONTROL DURING DIGITAL RECORDING/REPRODUCTION

CROSS-REFERENCE TO RELATED APPLICATIONS

The subject matter of this application is related in part to subject matter disclosed in commonly assigned prior co-pending U.S. patent application Ser. No. 08/177,179 filed Jan. 4, 1994 by one of the applicants hereof.

BACKGROUND OF THE INVENTION

1. Field of the Invention

The present invention relates in general to a digital/analog recording/playback system which is capable of recording and playing back a digital video signal as well as an analog video signal and which is compatible with an existing VHS system, and more particularly to a tracking control apparatus and method for a digital/analog recording/playback system in which, during recording of a digital video signal by heads for recording such a digital video signal, a tracking signal is separately recorded by heads for the analog video signal so that a loss of the digital video signal can be reduced.

2. Description of the Prior Art

Generally, a video signal is recorded on tracks of a tape by heads and the recorded video signal is played back as the tracks are traced by the heads. Also, a tracking signal is recorded on the tape in a wound direction thereof as a control signal for the track tracing. The recording of the tracking signal is performed in the unit of a frame of the video signal or an integer multiple of frames thereof. The playback of the recorded video signal is performed by the heads with the recorded tracking signal played back.

In a conventional method of recording and playing back a tracking signal, the tracking signal is recorded on a particular track of the tape at an interval of a frame of the video signal or an integer multiple of frames thereof. For this reason, a tracking error cannot be obtained with respect to all tracks of the tape.

In another conventional method of recording and playing back a tracking signal, the video signal and a pilot signal as the tracking signal are recorded on the same track of the tape. The tracking error is obtained by comparing pilot signal levels of the adjacent tracks with each other in the playback. In this method, the tracking error can be obtained with respect to all tracks of the tape. This makes it possible to control a tracking error component which may be generated when the heads trace the corresponding tracks of the tape leaning to the left and right thereof. However, the latter method has a disadvantage in that a recording frequency band of the video signal is reduced by that of the pilot signal because it is recorded on the same track together with the pilot signal, overlapping with the pilot signal. This results in a degradation in a signal-to-noise ratio of the video signal. On the other hand, a digital video signal must be recorded with density much higher than that of an analog video signal for a predetermined time period since it has a recording amount (about 5 times) much more than that of the analog video signal. In this connection, the latter method has another disadvantage in that the digital video signal experiences a large loss because it is recorded on the same track together with the tracking signal.

SUMMARY OF THE INVENTION

Therefore, the present invention has been made in view of the above problems, and it is an object of the present invention to provide a tracking control apparatus and method for a recording/playback system in which a tracking signal is recorded by heads for an analog video signal on a track portion of a tape on which a digital video signal is not recorded, so that a loss of the digital video signal can be reduced.

In accordance with one aspect of the present invention, there is provided a tracking control apparatus for a recording/playback system comprising tracking signal generation means for generating a tracking signal for the control of track tracing; system control means for outputting a plurality of control signals according to a mode selected by the user; first switching means for selectively outputting the tracking signal from said tracking signal generation means under the control of said system control means when a digital video signal is selected for recording; second switching means for selecting one of the digital video signal and an analog video signal for a recording under the control of said system control means; signal transfer means for transferring the tracking signal from said first switching means when the digital video signal is selected by said second switching means and the analog video signal from said second switching means when the analog video signal is selected by said second switching means; first recording means for record-processing the tracking signal or the analog video signal from said signal transfer means in a record mode; second recording means for recording-processing the digital video signal from said second switching means in the recording mode; a head drum means for being rotated by a drum motor to record or play back one of the analog and digital video signals according to the selected mode, said head drum means having first and second heads for the recording and playback of the analog video signal and third and fourth heads for the recording and playback of the digital video signal; third to sixth switching means for selecting said first to fourth heads, respectively, under the control of said system control means to record output signals from said first and second recording means on a tape, the output signal from said first recording means being recorded on the tape by said first and second heads selected respectively by said third and fourth switching means, the output signal from said second recording means being recorded on the tape by said third and fourth heads selected respectively by said fifth and sixth switching means; capstan means for being rotated by a capstan motor to transport the tape according to the selected mode; an audio/control head for recording and playing back a control signal for the recording and playback of the analog and digital video signals on/from the tape; first playback means for playback-processing a signal played back by said first and second heads selected respectively by said third and fourth switching means under the control of said system control means in a playback mode; second playback means for playback-processing a signal played back by said third and fourth heads selected respectively by said fifth and sixth switching means under the control of said system control means in the playback mode; tracking signal detection means for detecting the tracking signal from an output signal from said first playback means; tracking control means for generating a tracking control signal in response to the detected tracking signal from said tracking signal detection means and outputting the tracking control signal to said system control means, said system control means controlling a phase of the capstan motor in response to the tracking control signal from said tracking control means; control signal processing means for controlling rotation speeds of the drum motor and capstan motor in response to the control signal played back by said audio/control head in the playback mode; and seventh switching means for selectively outputting signals output from said first and second playback means under the control of said system control means.

In accordance with another aspect of the present invention, there is provided a tracking control method for a recording/playback system comprising the steps of (a) recording a tracking signal using first and second heads for the recording and playback of an analog video signal and recording a digital video signal using third and fourth heads for the recording and playback of the digital video signal; and (b) playing back the tracking signal recorded at said step (a) using said first and second heads and playing back the digital video signal recorded at said step (a) using said third and fourth heads.

BRIEF DESCRIPTION OF THE DRAWINGS

The above and other objects, features and advantages of the present invention will be more clearly understood from the following detailed description taken in conjunction with the accompanying drawings, in which:

FIGS. 4A to 4M are waveform diagrams of signals from components in the tracking control apparatus in FIG. 2.

DETAILED DESCRIPTION OF THE PREFERRED EMBODIMENT

Figure 2:
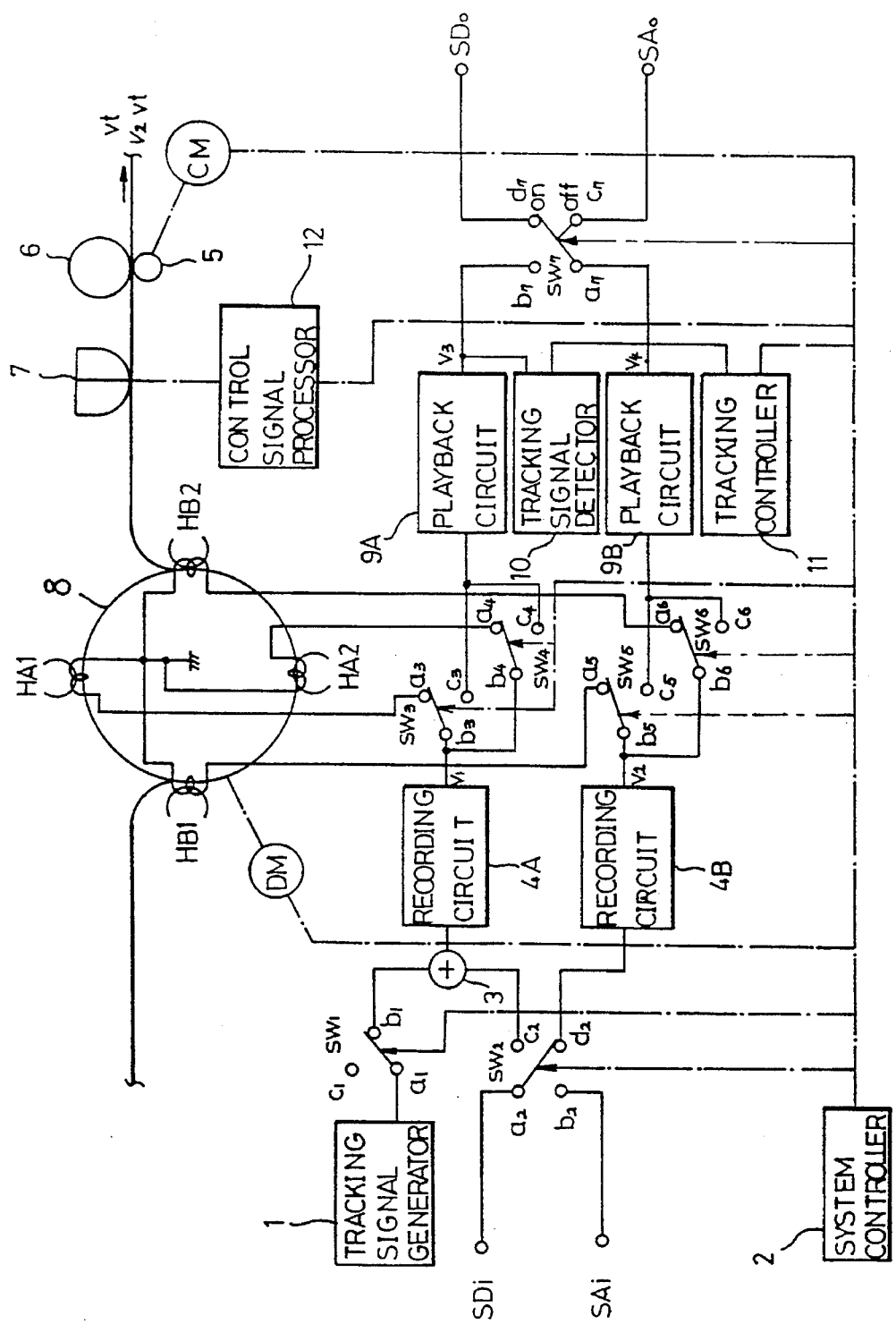
FIG. 2 is a block diagram of a tracking control apparatus for a recording/playback system in accordance with the present invention.

Referring to FIG. 2, there is shown a block diagram of a tracking control apparatus for a recording/playback system in accordance with the present invention. As shown in this drawing, the tracking control apparatus comprises a tracking signal generator 1 for generating a tracking signal ATF for the control of track tracing, a system controller 2 for outputting a plurality of control signals according to a mode selected by the user, a switch SW1 for selectively outputting the tracking signal ATF from the tracking signal generator 1 under the control of the system controller 2 when a digital video signal SDi is selected for recording, and a switch SW2 for selecting one of the digital video signal SDi and an analog video signal SAi for recording under the control of the system controller 2.

An adder 3 is provided in the tracking control apparatus to transfer the tracking signal ATF from the switch SW1 when the digital video signal SDi is selected by the switch SW2 and the analog video signal SAi from the switch SW2 when the analog video signal SAi is selected by the switch SW2.

Recording circuits 4A and 4B are also provided in the tracking control apparatus to record-process the tracking signal ATF or the analog video signal SAi from the adder 3 and the digital video signal SDi from the switch SW2 in a recording mode, respectively.

A head drum 8 is rotated by a drum motor DM to record or play back one of the analog and digital video signals according to the selected mode. The head drum 8 has heads HA1 and HA2 for the recording and playback of the analog video signal and heads HB1 and HB2 for the recording and playback of the digital video signal.

Switches SW3–SW6 are also provided in the tracking control apparatus to select the heads HA1, HA2, HB1 and HB2, respectively, under the control of the system controller 2 to record output signals V1 and V2 from the recording circuits 4A and 4B on a tape. The output signal V1 from the recording circuit 4A is recorded on the tape by the heads HA1 and HA2 selected respectively by the switches SW3 and SW4. The output signal V2 from the recording circuit 4B is recorded on the tape by the heads HB1 and HB2 selected respectively by the switches SW5 and SW6.

A capstan 5 is adapted to be rotated by a capstan motor CM to transport the tape according to the selected mode.

An audio/control head 7 is also provided in the tracking control apparatus to record and play back an audio signal as well as a control signal for the recording and playback of the analog and digital video signals on/from the tape.

Also, the tracking control apparatus comprises a playback circuit 9A for playback-processing a signal played back by the heads HA1 and HA2 selected respectively by the switches SW3 and SW4 under the control of the system controller 2 in a playback mode, a playback circuit 9B for playback-processing a signal played back by the heads HB1 and HB2 selected respectively by the switches SW5 and SW6 under the control of the system controller 2 in the playback mode, a tracking signal detector 10 for detecting the tracking signal ATF from an output signal from the playback circuit 9A, and a tracking controller 11 for generating a tracking control signal CATF in response to the detected tracking signal ATF from the tracking signal detector 10 and outputting the tracking control signal CATF to the system controller 2. The system controller 2 controls a phase of the capstan motor CM in response to the tracking control signal CATF from the tracking controller 11.

The tracking control apparatus also comprises a control signal processor 12 for controlling rotation speeds of the drum motor DM and capstan motor CM in response to the control signal played back by the audio/control head 7 in the playback mode, and a switch SW7 for selectively outputting one of output signals from the playback circuits 9A and 9B under the control of the system controller 2.

Each of the recording circuits 4A and 4B includes a pre-amplifier, a modulator and an equalizer.

Figure 1A:
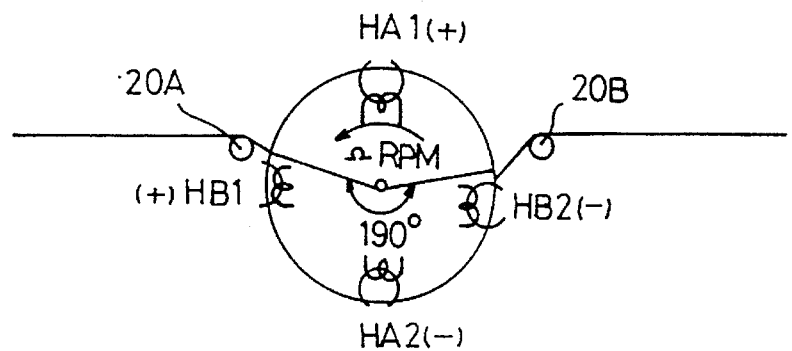
FIG. 1A is a view illustrating a construction of a head drum which is applied in the present invention.
Figure 1B:
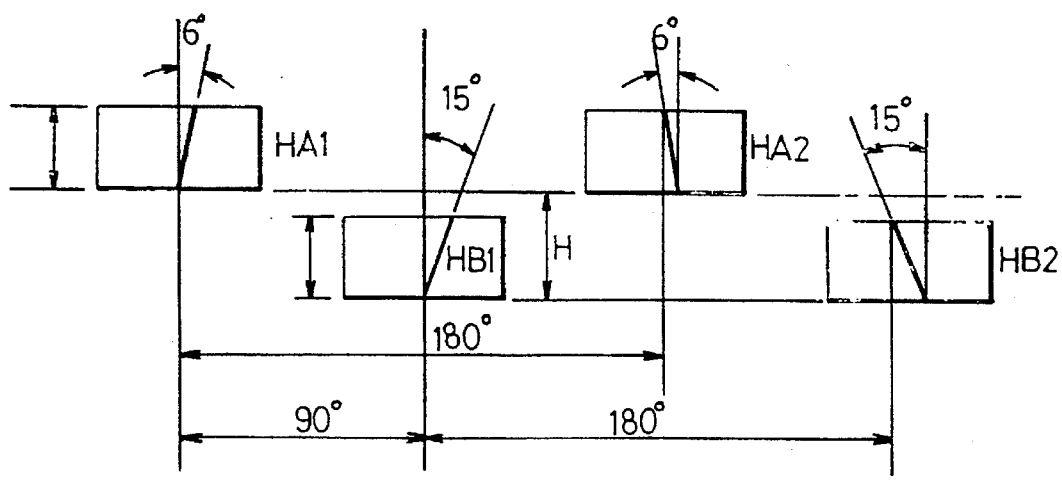
FIG. 1B is a view illustrating locations of heads in the head drum in FIG. 1A.

FIG. 1A is a view illustrating a construction of the head drum 8 and FIG. 1B is a view illustrating locations of the heads HA1, HA2, HB1 and HB2 in the head drum 8 in FIG. 1A. As shown in FIG. 1A, the heads HA1, HA2, HB1 and HB2 are located in the head drum 8 at an angle of 90° between the adjacent ones. Two guide posts 20A and 20B are provided so that the tape has an azimuth angle of 180° or more. Also, a phase generator PG (not shown) is mounted to the head drum 8. In response to an output signal from the phase generator PG, the switches SW3–SW6 are switched to select the heads HA1, HA2, HB1 and HB2.

In FIG. 1B, the heads HA1 and HA2 for the recording and playback of the analog video signal have the opposite angle of 180° and azimuth angles of ±6°, respectively. The heads HB1 and HB2 for the recording and playback of the digital video signal have the opposite angle of 180° and azimuth angles of ±15°, respectively. Also, the heads HB1 and HB2 have phase angles of 90° with respect to the heads HA1 and HA2, respectively.

In FIG. 2, reference numeral 6 designates a pinch roller for transporting the tape in conjunction with capstan S.

The operation of the tracking control apparatus with the above-mentioned construction in accordance with the present invention will hereinafter be described in detail with reference to FIGS. 1A to 4M. FIGS. 3A to 3D are views illustrating recording patterns of the video and tracking signals in accordance with the present invention and FIGS. 4A to 4M are waveform diagrams of the signals from the components in the tracking control apparatus in FIG. 2.

First, in the recording mode, the analog video signal SAi or the digital video signal SDi is selected by the switch SW2 under the control of the system controller 2 and then applied to the recording circuit 4A or 4B. Then, contacts a3–a6 of the switches SW3–SW6 are connected to contacts b3–b6 thereof under the control of the system controller 2, respectively.

For example, in the case where the digital video signal SDi is selected for the recording, a contact a2 of the switch SW2 is connected to a contact d2 thereof. As a result, the digital video signal SDi is applied to the recording circuit 4B through the switch SW2. The recording circuit 4B is adapted to amplify the digital video signal SDi by a predetermined amplification degree and modulate the amplified video signal. The modulated video signal V2 from the recording circuit 4B is applied to the heads HB1 and HB2 for the recording and playback of the digital video signal through the switches SW5 and SW6 under the control of the system controller 2.

The tape is transported at half (½ Vt) the recording speed (Vt) of the analog video signal by the capstan S rotated by the capstan motor CM under the control of the system controller 2. A head switching signal is applied to the heads HB1 and HB2 as shown in FIGS. 4A and 4B. The modulated video signal V2 from the recording circuit 4B is recorded on a portion of the tape wound at an angle of 180° with respect to the head drum 8 by the heads HB1 and HB2 in response to the head switching signal, as shown in FIGS. 3B and 3C.

Also, the control signal Ctl B, as shown in FIG. 4C is recorded on a portion 102 below the slanted tracks of the tape by the audio/control head 4.

The tracking signal ATF from the tracking signal generator 1 is applied to the recording circuit 4A through the switch SW1 and the adder 3 and then modulated by the recording circuit 4A, while the modulated video signal V2 from the recording circuit 4B is recorded on the 180°-wound portion of the tape by the heads HB1 and HB2. The output signal V1 from the recording circuit 4A is applied to the heads HA1 and HA2 for the recording and playback of the analog video signal through the switches SW3 and SW4 under the control of the system controller 2. As a result, the output signal V1 from the recording circuit 4A is recorded by the heads HA1 and HA2 on upper and lower 5° portions adjoining the 180°-wound portion of the tape on which the signal V2 is recorded by the heads HB1 and HB2, as shown in FIGS. 3B and 3C and FIGS. 4D and 4E.

Namely, in the recording mode of the digital video signal, the tracking signal is recorded by the heads HA1 and HA2, not presently used for the recording of the video signal, at the same time that the digital video signal is recorded by the heads HB1 and HB2. At this time, the tracking signal is recorded by the heads HA1 and HA2 on the upper and lower 5° portions adjoining the 180°-wound portion of the tape on which the digital video signal is recorded by the heads HB1 and HB2, resulting in formation of a recording pattern as shown in FIG. 3A.

Figure 3A:
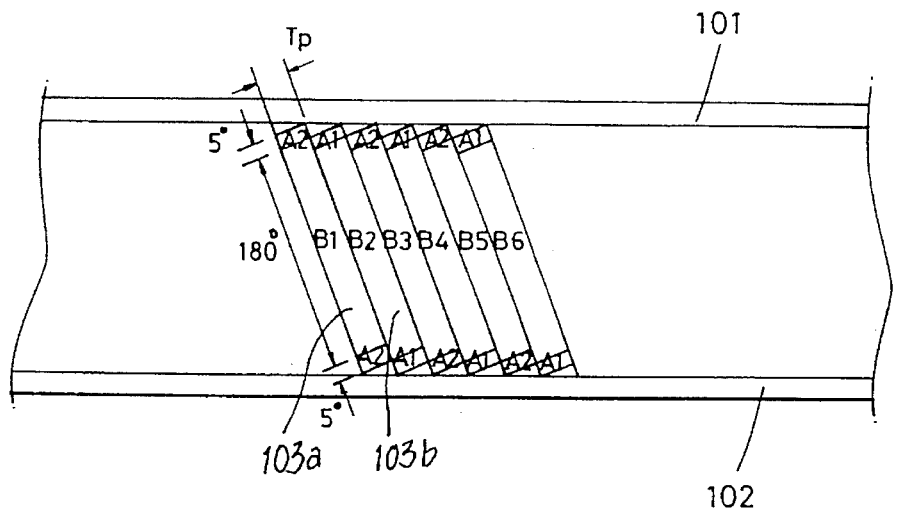
FIGS. 3A to 3D are views illustrating recording patterns of video and tracking signals in accordance with the present invention.
Figure 3B:
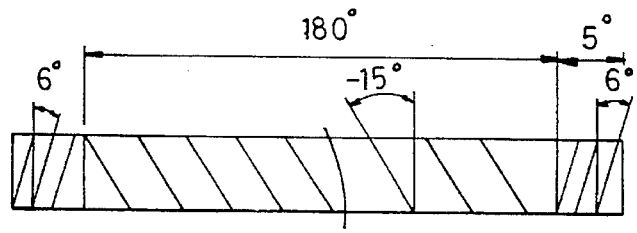
Figure 3C:
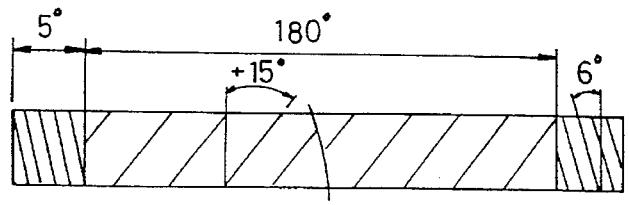

Slant tracks 103a and 103b are formed on the tape as shown in FIG. 3A. The slant tracks 103a and 103b have track pitches Tp at a desired interval and azimuth angles of ±15°, respectively. As shown in FIGS. 3B and 3C, the digital video signal is recorded on the 180°-wound portions of the slant tracks 103a and 103b. Also, slant tracks, having azimuth angles of 6°, are formed on the upper and lower 5° portions adjoining the 180°-wound portions of the slant tracks 103a and 103b. The tracking signal ATF is recorded on the slant tracks formed on the upper and lower 5° portions adjoining the 180°-wound portions of the slant tracks 103a and 103b. The control signal Ctl B is recorded on the portion 102 below the slanted tracks of the tape and an audio signal is recorded on a portion 101 above the slanted tracks thereof.

On the other hand, in the case where the analog video signal SAi is selected for recording, the contact a1 of the switch SW1 is connected to a contact c1 thereof. As a result, the tracking signal from the tracking signal generator 1 is not applied to the adder 3.

Figure 3D:
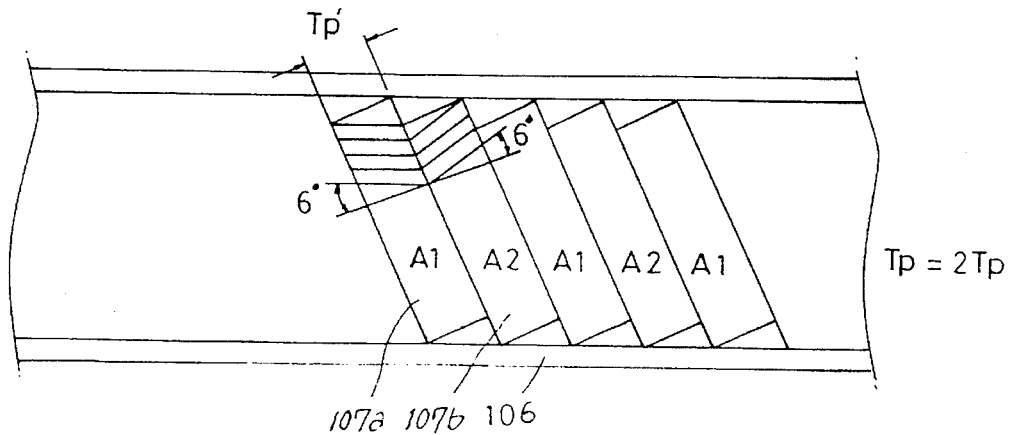

Also, a contact b2 of the switch SW2 is connected to a contact c2 thereof. As a result, the analog video signal SAi is applied to the recording circuit 4A through the switch SW2. The recording circuit 4A is adapted to amplify the analog video signal SAi by a predetermined amplification degree and modulate the amplified video signal. The modulated video signal V1 from the recording circuit 4A is applied to the heads HA1 and HA2 for the recording and playback of the analog video signal through the switches SW3 and SW4 under the control of the system controller 2. At this time, the heads HA1 and HA2 are switched in response to a head switching signal as shown in FIG. 4F. In this case, the tape is transported at the normal speed Vt by the capstan 5 rotated by the capstan motor CM under the control of the system controller 2. Therefore, the modulated video signal V1 from the recording circuit 4A is recorded on the tape transported at the normal speed Vt by the heads HA1 and HA2, as shown in FIG. 3D. Also, the control signal Ctl A, as shown in FIG. 4G, is recorded on a portion 106 below the slanted tracks of the tape by the audio/control head 4.

In this case, slant tracks 107a and 107b are formed on the tape as shown in FIG. 3D. The slant tracks 107a and 107b have track pitches Tp' (2Tp) at a desired interval and azimuth angles of ±6°, respectively. The analog video signal SAi is recorded on the slant tracks 107a and 107b of the tape and the control signal Ctl A is recorded on the portion 106 below the slanted tracks of the tape. It should be noted that the control signal Ctl A is recorded compatibly with a tape pattern of the existing VHS type.

The head drum 8 is rotated at 3600 rpm for the digital video signal and at 1800 rpm for the analog video signal, by the drum motor DM under the control of the system controller 2.

On the other hand, in the playback mode, the contacts a3–a6 of the switches SW3–SW6 are connected to contacts c3–c6 thereof under the control of the system controller 2, respectively. As a result, the signals played back by the heads HA1 and HA2 and HB1 and HB2 are applied to the playback circuits 9A and 9B, respectively.

At this time, the tracking signal detector 10 detects the tracking signal ATF from the output signal from the playback circuit 9A and applies the detected tracking signal ATF to the tracking controller 11. The presence of the tracking signal ATF means that the digital video signal was recorded on the tape. In this case, the tracking controller 11 outputs the enabled tracking control signal CATF to the system controller 2. On the contrary, the absence of the tracking signal ATF signifies that the analog video signal was recorded on the tape. In this case, the tracking controller 11 outputs the disabled tracking control signal CATF to the system controller 2.

The tracking signal ATF is recorded on the tape as shown in FIG. 4H. In this connection, the presence of the tracking signal ATF can be determined by detecting only a desired band of the tracking signal ATF even when the heads trace the corresponding tracks of the tape leaning to the left and right thereof.

One of the output signals V3 and V4 From the playback circuits 9A and 9B is selected by the switch SW7 under the control of the system controller 2.

For example, in the case where the presence of the tracking signal ATF cannot be determined because it is very small in level, the phase of the capstan motor CM is controlled according to the level of the tracking signal ATF. Therefore, the heads can trace the corresponding tracks of the tape with no error. Also, the rotation speeds of the drum motor DM and capstan motor CM are controlled on the basis of the tracking signal ATF.

Thereafter, upon detection of the control signal by the audio/control head 7, the control signal processor 12 controls the rotation speeds of the drum motor DM and capstan motor CM in response to the control signal from the audio/control head 7.

The output signal from the phase generator PG in the head drum 8 is applied to the system controller 2, thereby causing the system controller 2 to control the switches SW3–SW6. As shown in FIGS. 4I and 4J, the output signal from the phase generator PG is earlier in phase by time ta than the output of the heads HB1 and HB2 for the digital video signal and by time tb than the output of the heads HA1 and HA2 for the analog video signal.

In the case where the digital video signal is played back, the switches SW3 and SW4 are switched in response to the head switching signal as shown in FIG. 4F from the system controller 2, thereby causing the output of the heads HA1 and HA2 to be applied to the playback circuit 9A and then demodulated by the playback circuit 9A, as shown in FIGS. 4K and 4L.

Then, the output signal V3 from the playback circuit 9A is applied to the tracking signal detector 10, which outputs the tracking signal ATF as shown in FIGS. 4D and 4E. In response to the tracking signal ATF from the tracking signal detector 10, the tracking controller 11 applies the enabled tracking control signal CATF to the system controller 2.

The system controller 2 controls the phase of the capstan motor CM in response to the tracking control signal CATF from the tracking controller 11, so that the tracks of the tape can accurately be traced by the heads. Also, the system controller 2 outputs a head switching signal as shown in FIG. 4M.

The switches SW5 and SW6 are switched in response to the head switching signal as shown in FIG. 4M from the system controller 2, thereby causing the output of the heads HB1 and HB2 to be applied to the playback circuit 9B and then demodulated by the playback circuit 9B, as shown in FIGS. 4A and 4B. The demodulated signal from the playback circuit 9B is outputted through the switch SW7.

On the other hand, in the case where the analog video signal is played back, the switches SW3 and SW4 are switched in response to the head switching signal as shown in FIG. 4F from the system controller 2, thereby causing the analog video signal from the heads HA1 and HA2 to be applied to the playback circuit 9A and then demodulated by the playback circuit 9A, as shown in FIGS. 4K and 4L.

As apparent from the above description, according to the present invention, the tracking signal is recorded by the heads for the analog video signal, not used in the recording of the digital video signal, on the upper and lower 5° portions of the 180°-wound portion of the tape with respect to the head drum. Therefore, a loss of the digital video signal can be avoided. This has the effect of obtaining a high picture quality.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A tracking control apparatus for a digital/analog video recording/playback system, comprising:

tracking signal generation means for generating a tracking signal for the control of track tracing;

system control means for outputting a plurality of control signals according to a mode selected by a user from among a digital video signal recording mode, an analog video signal recording mode and a playback mode;

first switching means, operably connected with said tracking signal generation means and said system control means, for outputting the tracking signal from said tracking signal generation means under the control of said system control means when the digital video signal recording mode is selected;

second switching means, operably connected with said system control means, for outputting a respective one of an input digital video signal and an input analog video signal for recording under the control of said system control means when the digital video signal recording mode and the analog video signal recording mode are selected, respectively;

transferring means, operably connected with said first switching means and said second switching means, for transferring the tracking signal outputted from said first switching means and for transferring the input analog video signal outputted from said second switching means;

first recording circuit means, operably connected with said transferring means, for record-processing the tracking signal and the analog video signal transferred from said transferring means;

second recording circuit means, operably connected with said second switching means, for record-processing the digital video signal outputted from said second switching means;

head drum means, for being rotated by a drum motor, to record onto and play back from a videotape one of an analog video signal and a digital video signal according to the selected mode, said head drum means having first and second head means for recording and playing back the analog video signal, and third and fourth head means for recording and playing back the digital video signal;

third to fourth switching means, operably connected with said first and second head means, respectively, and with said system control means and said first recording circuit means, for selecting said first and second head means, under the control of said system control means, to record onto the videotape the tracking signal record-processed by said first recording circuit means when the digital video signal recording mode is selected, to play back the recorded tracking signal from the videotape in the playback mode, to record the analog video signal record-processed by said first recording circuit means when the analog video signal recording mode is selected and to play back the recorded analog video signal from the videotape in the playback mode;

fifth to sixth switching means, operably connected with said third and fourth head means, respectively, and with said system control means and said second recording circuit means, for selecting said third and fourth head means, under the control of said system control means, to record onto the videotape the digital video signal record-processed by said second recording circuit means when the digital video signal recording mode is selected, and to play back the recorded digital video signal from the videotape in the playback mode;

capstan means, for being rotated by a capstan motor under operable control of said system control means, to transport the videotape with respect to the head drum means according to the selected mode;

audio/control head means for recording on, and playing back from, the videotape a control signal for controlling the recording and playing back of the analog video signal and the digital video signal;

first playback circuit means, operably connected with said third to fourth switching means, for playback-processing the analog video signal and the tracking signal played back by said first and second head means, said head means being selected, respectively, by said third and fourth switching means in the playback mode;

second playback circuit means, operably connected with said fifth to sixth switching means, for playback-processing the digital video signal played back by said third and fourth head means, said head means being selected, respectively, by said fifth and sixth switching means in the playback mode;

tracking signal detection means, operably connected with said first playback circuit means, for detecting the playback-processed tracking signal from an output signal from said first playback circuit means;

tracking control means, operably connected with said tracking signal detection means and said system control means, for generating the tracking control signal in response to the detected tracking signal from said tracking signal detection means, and for outputting the tracking control signal to said system control means in order to enable said system control means to control a phase of the capstan motor in response to the tracking control signal from said tracking control means;

control signal processing means, operably connected with said audio/control head means, said drum motor and said capstan motor, for controlling a rotation speed of the drum motor and a rotation speed of the capstan motor in response to the control signal played back by said audio/control head means in the playback mode; and seventh switching means, operably connected with said first and second playback circuit means, for selectively outputting one of the playback-processed analog video signal and the playback-processed digital video signal output, respectively, from said first and second playback circuit means under the control of said system control means.

2. A tracking control signal recording/playback method for a digital/analog video recording/playback system provided with a rotary head drum having first and second heads for the recording and playing back of analog video signals, and having third and fourth heads for the recording and playing back of digital video signals, the method comprising the steps of:

(a) recording a tracking signal on a videotape using said first and second heads, while recording a digital video signal on said videotape using said third and fourth heads; and (b) playing back the tracking signal recorded in step (a) using said first and second heads, while playing back the digital video signal recorded in step (a) using said third and fourth heads.

3. The tracking control signal recording/playback method as set forth in claim 2, wherein the digital video signal is recorded on a portion of said videotape wound at an angle of 180° with respect to said head drum and the tracking signal is recorded on upper and lower 5°-wound portions of the videotape adjoining the 180°-wound portion of the tape on which said digital video signal is recorded.

4. A tracking control apparatus for a videotape recorder, comprising:

rotary head drum means for recording onto, and playing back from, a videotape an analog video signal and a digital video signal, said head drum means having analog video head means for recording and playing back an analog video signal, and digital video head means for recording and playing back a digital video signal;

tracking signal generation means for generating a tracking signal for control of track tracing;

recording means for applying an analog video signal to be recorded using said analog head means while applying said tracking signal from said tracking signal generation means to said analog video head means during an analog video signal recording mode, and for applying a digital video signal to be recorded with said digital video head means while applying said tracking signal from said tracking signal generation means to said analog video head means during a digital video signal recording mode;

playback means for receiving the reproduced analog video signal and the reproduced tracking signal played back by said analog video head means during playback of an analog video signal, and for receiving the reproduced digital video signal played back by said digital video head means while receiving the reproduced tracking signal played back by said analog video head means during a playback of a digital video signal; and control means, for controlling tracing of tracks of said videotape in accordance with the tracking signal played back from said videotape by said analog video head means.

5. The tracking control apparatus according to claim 4, wherein said analog video head means and said digital video head means have different respective head azimuth angles.

6. The tracking control apparatus according to claim 4, wherein said digital video head means have a first head azimuth angle and said analog video head means have a second head azimuth angle different from said first head azimuth angle.

7. The tracking control apparatus according to claim 6, wherein said first head azimuth angle is greater than said second head azimuth angle.

8. The tracking control apparatus according to claim 4, wherein said digital video head means record and play back the digital video signal to and from, respectively, a first portion of the videotape wound 180° with respect to said head drum means, and said analog video head means record and play back the tracking signal to and from, respectively, portions of the videotape adjoining upper and lower ends of said first portion and each wound 5° with respect to said head drum.

9. The tracking control apparatus according to claim 4, wherein said control means comprises:

means for detecting the reproduced tracking signal from said playback means and for generating a tracking control signal in response thereto; and means for controlling a rotation speed of said head drum means and a transport speed of the videotape for playing back said digital video signal in accordance with said tracking control signal.

* * * * *